US012811401B2

(12) United States Patent
Nasr Azadani et al.

(10) Patent No.: US 12,811,401 B2
(45) Date of Patent: Nov. 24, 2026

(54) SYSTEMS AND METHODS FOR DISCRETELY REFUELABLE ENERGY SOURCE IN A DATACENTER

(71) Applicant: Microsoft Technology Licensing, LLC, Redmond, WA (US)

(72) Inventors: Ehsan Nasr Azadani, Sammamish, WA (US); Christian L. Belady, Mercer Island, WA (US); Paul Andrew Churnock, Ofallon, IL (US); Sean Michael James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 554 days.

(21) Appl. No.: 18/203,491

(22) Filed: May 30, 2023

(65) Prior Publication Data

US 2024/0332971 A1 Oct. 3, 2024

Related U.S. Application Data

(60) Provisional application No. 63/456,358, filed on Mar. 31, 2023.

(51) Int. Cl.
*H02J 3/17* (2026.01)
*H02J 101/20* (2026.01)

(52) U.S. Cl.
CPC ............. *H02J 3/17* (2026.01); *H02J 2101/20* (2026.01)

(58) Field of Classification Search
CPC .............................. H02J 3/144; H02J 2300/20
USPC .......................................................... 700/295
See application file for complete search history.

(56) References Cited

U.S. PATENT DOCUMENTS

| | | | |
|---|---|---|---|
| 10,103,569 | B2 | 10/2018 | Li |
| 11,188,142 | B1 | 11/2021 | Beserra |
| 11,239,665 | B2 | 2/2022 | Navarro |
| 11,605,970 | B2 | 3/2023 | Chen |
| 2002/0145404 | A1 | 10/2002 | Dasgupta |

(Continued)

FOREIGN PATENT DOCUMENTS

| | | | |
|---|---|---|---|
| CN | 108898282 | A | 11/2018 |
| EP | 4060851 | A1 | 9/2022 |
| KR | 20210016795 | A | 2/2021 |

OTHER PUBLICATIONS

International Search Report and Written Opinion received for PCT Application No. PCT/US2024/026128, Sep. 4, 2024, 13 pages.

(Continued)

*Primary Examiner* — Jigneshkumar C Patel
(74) *Attorney, Agent, or Firm* — Ray Quinney & Nebeker P.C.; John O. Carpenter

(57) ABSTRACT

A system for providing power to a datacenter includes an information technology (IT) load, a grid connection, a grid information source, a discretely refuellable energy source, and an energy controller. The grid connection provides electrical communication between the IT load and a power grid. The grid information source is in communication with the grid connection and configured to obtain grid information. The discretely refuellable energy source is in electrical communication with the IT load. The energy controller is in data communication with the grid information source and configured to discharge the discretely refuellable energy source to the IT load based at least partially on the grid information.

17 Claims, 7 Drawing Sheets

(56) References Cited

U.S. PATENT DOCUMENTS

| | | | | |
|---|---|---|---|---|
| 2009/0235097 | A1 | 9/2009 | Hamilton et al. | |
| 2011/0101779 | A1 | 5/2011 | Patel | |
| 2011/0204854 | A1 | 8/2011 | King | |
| 2013/0111494 | A1 | 5/2013 | Hyser et al. | |
| 2013/0117592 | A1 | 5/2013 | Humphrey | |
| 2015/0171666 | A1 | 6/2015 | Yeon | |
| 2015/0221993 | A1 | 8/2015 | Wang | |
| 2018/0026316 | A1 | 1/2018 | Teng | |
| 2018/0052431 | A1 | 2/2018 | Shaikh | |
| 2018/0285767 | A1* | 10/2018 | Chew | G06N 20/00 |
| 2019/0089023 | A1 | 3/2019 | Sastry | |
| 2019/0258307 | A1 | 8/2019 | Shaikh | |
| 2020/0274367 | A1* | 8/2020 | Navarro | H02J 3/28 |
| 2021/0004035 | A1 | 1/2021 | Yang et al. | |
| 2022/0077707 | A1 | 3/2022 | Yan | |
| 2022/0102998 | A1 | 3/2022 | Xu | |
| 2022/0109315 | A1 | 4/2022 | Jeong | |
| 2022/0416545 | A1* | 12/2022 | Diamond | G05B 15/02 |
| 2024/0372389 | A1 | 11/2024 | Nasr Azadani | |

OTHER PUBLICATIONS

Non-Final Office Action mailed on Jul. 9, 2025, in U.S. Appl. No. 18/311,119, 16 pages.

International Search Report and Written Opinion received for PCT Application No. PCT/US2024/019474, Aug. 6, 2024, 13 pages.

Final Office Action mailed on Dec. 5, 2025, in U.S. Appl. No. 18/311,119, 21 pages.

International Preliminary Report on Patentability received for PCT Application No. PCT/US2024/019474, mailed on Oct. 9, 2025, 08 pages.

International Preliminary Report on Patentability received for PCT Application No. PCT/US2024/026128, mailed on Nov. 13, 2025, 08 pages.

Notice of Allowance mailed on Mar. 11, 2026, in U.S. Appl. No. 18/311,119, 10 pages.

* cited by examiner

SYSTEMS AND METHODS FOR DISCRETELY REFUELABLE ENERGY SOURCE IN A DATACENTER

CROSS-REFERENCE TO RELATED APPLICATIONS

This application claims priority to and the benefit of U.S. Provisional Patent Application No. 63/456,358, filed on Mar. 31, 2023, which are hereby incorporated by reference in their entireties.

BACKGROUND

Datacenters require a robust backup system for electrical power to ensure reliable uptimes. Different backup systems are more efficient at different energy storage durations, and different backup systems have different start or refueling times that can cause delays in the response of the backup system.

BRIEF SUMMARY

In some embodiments, a system for providing power to a datacenter includes an information technology (IT) load, a grid connection, a grid information source, a discretely refuellable energy source, and an energy controller. The grid connection provides electrical communication between the IT load and a power grid. The grid information source is in communication with the grid connection and configured to obtain grid information. The discretely refuellable energy source is in electrical communication with the IT load. The energy controller is in data communication with the grid information source and configured to discharge the discretely refuellable energy source to the IT load based at least partially on the grid information.

This Summary is provided to introduce a selection of concepts in a simplified form that are further described below in the Detailed Description. This Summary is not intended to identify key features or essential features of the claimed subject matter. Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
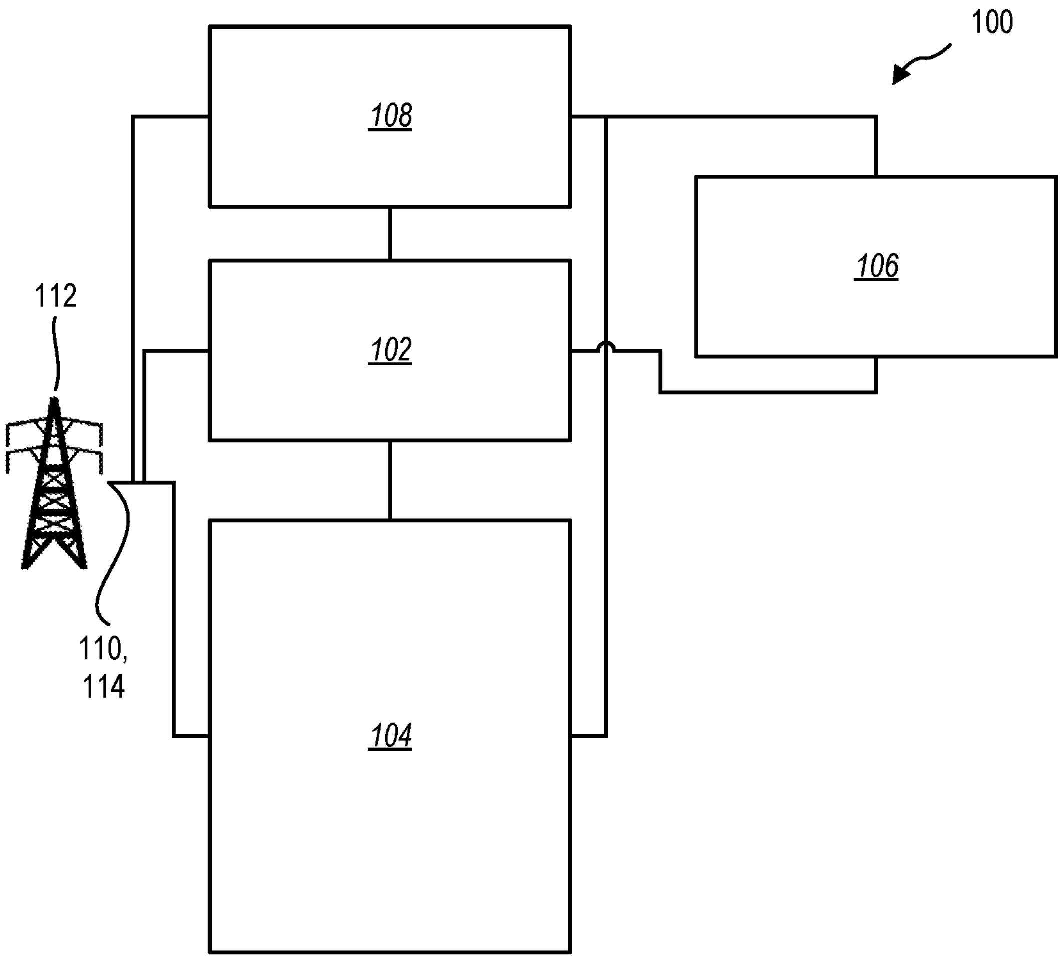
FIG. 1 is a schematic illustration of a system for providing electrical power in a datacenter, according to at least some embodiments of the present disclosure.

The present disclosure generally relates to systems and methods for storing and providing electrical power to a datacenter. More particularly, the present disclosure relates to systems and methods for managing a plurality of different energy storage devices for varying durations of storage and discharge of electrical energy to a datacenter.

Various energy storage systems (ESS) have different technical characteristics including duration, cost, performance, cycling lifetime, footprint, and other considerations. The duration of the ESS is related to the duration of time the ESS can retain the stored energy. For example, some ESSs are able to store energy substantially indefinitely, such as a gravity-based ESSs (e.g., potential energy storage); some ESSs are able to store energy for short durations (e.g., minutes to hours) before the stored energy is lost or discharged, such as some rechargeable chemical battery systems, kinetic energy storage, or other ESSs; and some ESSs are able to store energy for an intermediate duration between short-duration ESSs and long-duration ESSs, such as thermal storage or other chemical battery storage.

The cost of the various ESSs may be considered as a combination of capital expense cost and operating expense cost. For example, a particular ESS may have a lower capital expense cost with an associated increase in operating expense cost. In another example, another ESS may have a higher capital expense cost, but the operating cost to store the energy for backup may be substantially zero in a static ESS, such as a gravity-based ESS.

The performance of the ESS includes properties of the ESS technology and/or the configuration of the ESS such as discharge rate, charge rate, cycling life, refueling rate and/or complexity, and other properties that limit or allow the ESS to provide electrical power to the datacenter. In some embodiments, the discharge rate is a measure of the electrical power that is output by the ESS or by a module within the ESS. For example, in some examples, an ESS may have a maximum electrical output of 1 Megawatt. In such an example, the ESS may have ten modules that are individually able to discharge at 250 Kilowatts. The ESS, therefore, may have a lesser total discharge rate than the sum of the module discharge rates.

In some embodiments, the ESS is electrically rechargeable, such as an electrical battery that is rechargeable through application of electrical current to the battery, or a mechanical ESS (e.g., potential energy or kinetic energy storage) by providing an electrical current to a motor to move a mass against gravity (e.g., pumped hydrological storage) or accelerate a mass (e.g., flywheel kinetic storage).

In some embodiments, the cycling life of an ESS or components of the ESS can affect the selection of an ESS for a datacenter. For example, some types of ESS degrade a state of health (SOH) with each cycle of a rechargeable module. In at least one example, conventional lithium-ion batteries have a lifetime of approximately 3,000-5,000 cycles. In another example, nickel cadmium batteries have a cycle life of approximately 1,000 cycles. In another example, a pumped hydro ESS may be able to cycle water into and out of a reservoir substantially indefinitely without degradation in storage capacity of the reservoir.

Cycling life, in some embodiments, includes cycle control. For example, a cycle includes recharging (or refueling) and discharging the ESS. In some examples, a cycle may be halted mid-cycle, such as after discharging a predetermined portion of the stored energy or at a predetermined state of charge (SOC) of the ESS. In some examples, discharging the ESS may include reacting a fuel to produce energy, and stopping the reaction before completion may not be possible or may be inefficient. For example, halting a reaction may include introducing an additional reactant or buffer to stop the reaction, after which, restarting the reaction may not be possible.

In some embodiments, the ESS is continuously refuellable, such as a combustion generator. In some examples, a continuously refuellable ESS is continuously refuellable by fuel being added to a fuel tank in any amount (up to the capacity of the fuel tank) at any time. In some examples, the continuously refuellable ESS may be refuellable whether the continuously refuellable ESS is operating or not. This may allow a continuously refuellable ESS to be refueled during operation and continue producing power during refueling. In other examples, a coal combustion energy source or hydrogen fuel cell may be continuously refueled with any amount of fuel at any time. A continuously refuellable module or generator of an ESS is able to operate and produce electrical power substantially continuously, including through refueling.

In some embodiments, an ESS is discretely refuellable. In such examples, a discretely refuellable ESS is refueled by removal or replacement of a consumable fuel, such as a fuel rod, plate, pellet, or other replaceable fuel element. For example, a metal-air battery produces electrical power by reacting a consumable anode with air via a conductive medium. Refueling the metal-air battery includes removing and/or replacing the anode, during which the metal-air battery does not produce electrical power. Refueling a discretely refuellable ESS is therefore associated with downtime that creates a gap and/or limit on the electrical energy produced by the discretely refuellable ESS.

In some embodiments, another consideration of an ESS used in datacenter energy production includes the fuel type, such as material or state. Solid fuels may be more energy-dense than gaseous fuels, while fluid fuels may allow for simplified delivery, storage, and/or distribution of the fuel material at a site. Additionally, health and/or safety concerns of the ESS or the fuel material may affect the ESS selection. For example, some materials may require additional safety concerns or equipment that increase associated capital and/or operating costs, such as equipment costs, structural costs, or personnel costs. In other examples, some fuel materials may be regulated or prohibited in some regions.

In at least one embodiment, a footprint of the ESS affects the selection or use of the ESS for a datacenter. For example, some types of ESS require a minimum footprint on a site, such as due to footprint for fuel storage, safety considerations, or surface area, such as solar thermal collectors.

As described herein, a discretely refuellable ESS may use solid state replaceable fuel elements that are comparatively energy dense and relatively stable for intermediate- and long-duration storage. In some embodiments, a discretely refuellable ESS, such as a metal-air battery, allows for a high-performance backup with intermediate- and long-duration storage that is relatively energy dense and has a small footprint. A discretely refuellable ESS may be in communication with an energy controlled that coordinates the discharge of individual modules of the ESS, and the discharge of individual replaceable fuel elements, to stagger or overlap the discharge and approximate a continuously refuellable ESS, allowing continuous electrical power production without downtime for a datacenter.

FIG. 1 is a schematic diagram of a system 100 for use in a datacenter including an information technology (IT) load 102 that is powered by a discretely refuellable ESS 104. In some embodiments, the IT load includes a plurality of server computers, such as organized in server racks and/or rows, that perform a requested workload. The workload may vary with time, where the workload can require different quantities of server computers assigned to the workload and the server computers may draw different quantities of electrical power during the workload. In some embodiments, an allocator 106 is in data communication with the IT load 102 to allocate server computers and/or virtual machines (executed by the server computers) to a requested workload.

In some embodiments, an energy controller 108 is in data communication with the IT load 102 and/or the allocator 106 to manage electrical power delivery to the IT load 102. In some examples, the energy controller 108 manages electrical power delivery based at least partially on the workload. In some examples, the energy controller 108 manages electrical power delivery to the IT load 102 based at least partially on IT telemetry. In some embodiments, the IT telemetry is obtained by the energy controller 108 from the IT load 102, such as from the server computers, from a rack controller, or from a row controller. In some examples, IT telemetry includes power draw, processing utilization (e.g., as a percentage of available processing resources), memory utilization (e.g., as a percentage of available memory resources), and other real-time or historical data regarding the operation of the IT load 102.

The energy controller 108 is further in data communication with the discretely refuellable ESS 104 and a grid connection 110 to coordinate the delivery of electrical power to the IT load 102. In some embodiments, the grid connection 110 allows electrical communication between the system 100 and a regional power grid 112 to supply electrical power to the system 100. In the event of a failure of the regional power grid 112, in some embodiments, the energy controller 108 communicates with the discretely refuellable ESS 104 to discharge at least a portion of the electrical energy stored in the discretely refuellable ESS 104 to the IT load 102. In some examples, the failure of the regional power grid 112 is total, where no electrical power is provided from the regional power grid 112 to the system 100, and the energy controller 108 communicates with the discretely refuellable ESS 104 to provide electrical power sufficient to fully power the IT load 102. In some examples, the failure of the regional power grid 112 is partial, where electrical power is provided from the regional power grid 112 to the system 100 but the electrical power provided is less than the power demand of the IT load 102, and the energy controller 108 communicates with the discretely refuellable ESS 104 to provide electrical power sufficient to fully power the IT load 102. In some examples, the utility is required to reduce the load to recover imbalance between energy source and demand; the energy controller 108 communicates with the discretely refuellable ESS 104 to provide electrical power sufficient to fully power the IT load 102, while utility is recovering partial failure at grid.

In some embodiments, the energy controller 108 determines a discharge rate of at least one replaceable fuel element. In some embodiments, the energy controller 108 determines a first discharge rate of a first replaceable fuel element and a second discharge rate of a second replaceable fuel element that is different from the first discharge rate. In some embodiments, a discharge rate is determined based on IT telemetry, such as current power draw of the IT load. In some embodiments, a discharge rate is determined based at least partially on current or predicted workload. For example, the energy controller 108 may obtain a workload from the allocator 106 and/or from the IT load 102 to determine the power demand of the IT load 102 and/or an energy demand of the IT load 102 for the current workload. In at least one example, the current workload may require 400 MW peak power of electrical power to meet the power demand of the IT load 102 processing the workload, and the current workload may require 500 Megawatt-hours (MWh) to meet the energy demand of the current workload until the power is recovered and back to the grid. In at least one embodiment, the energy controller 108 communicates with the allocator 106 to migrate workload from the IT load 102 (e.g., to another IT load 102 or another datacenter) when the available energy in the discretely refuellable ESS 104 is insufficient to support the workload.

The energy controller 108 may be further in communication with a grid information source 114. In some embodiments, a grid information source 114 is part of the grid connection 110. In some embodiments, the grid information source 114 is accessed by the energy controller 108 by a network or other connection method. The grid information source 114 may provide the energy controller 108 with grid information to inform the energy controller of grid power pricing, grid power supply, grid power carbon load, and other properties of the electrical power provided by and/or available from the regional power grid 112. In some embodiments, the energy controller 108 determines discharge rate(s), timing, and duration based at least partially on the grid information.

Figure 2:
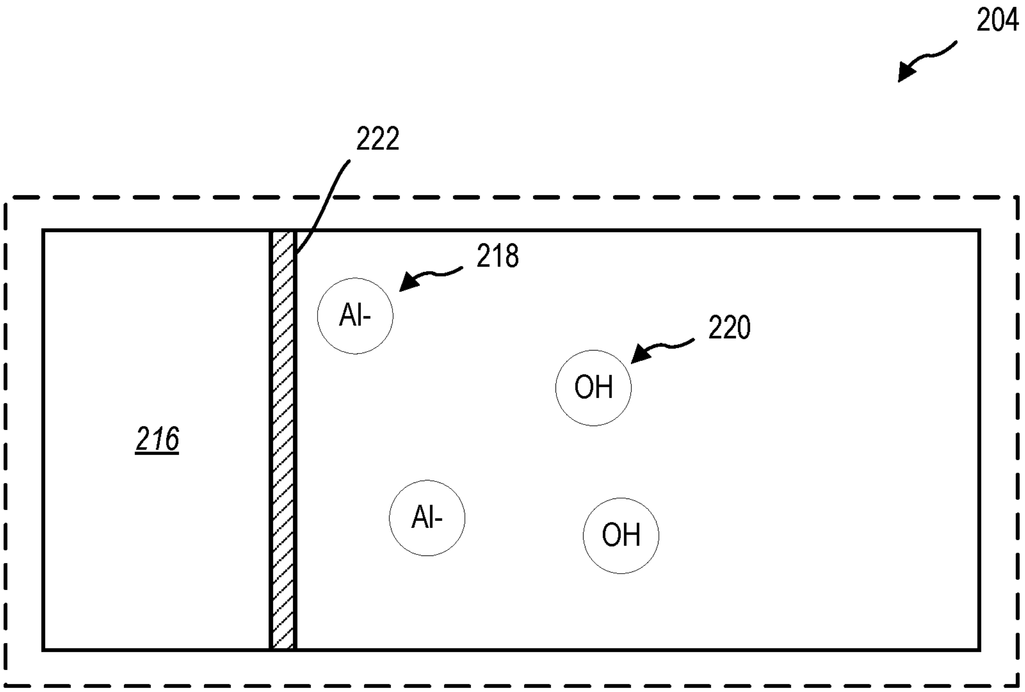
FIG. 2 is a schematic illustration of a discretely refuellable metal-air battery, according to at least some embodiments of the present disclosure.

FIG. 2 is a side view of an embodiment of a discretely refuellable ESS 204 including a metal-air battery, such as an aluminum-air battery. For example, the discretely refuellable ESS 204 may be a primary cell or primary battery that is not electrically rechargeable. The discretely refuellable ESS 204 includes a replaceable fuel element 216 that is consumable to produce electricity. In the illustrated embodiment, the replaceable fuel element 216 is an aluminum anode of the aluminum-air battery that provides aluminum ions 218 which react with hydroxide 220 molecules in an electrolyte to produce aluminum hydroxide 222 at the anode (i.e., replaceable fuel element 216). In some embodiments, the replaceable fuel element 216 is removed after aluminum hydroxide 222 covers the anode of the aluminum-air battery, slowing or stopping the reaction. The consumed replaceable fuel element 216 may be recycled.

The discretely refuellable ESS 204 therefore can produce electricity as long as the replaceable fuel element 216 can continue to produce electrical energy, and the discretely refuellable ESS 204 will stop producing electrical energy when the replaceable fuel element 216 is consumed and during the replacement of the replaceable fuel element 216. In some embodiments, a discretely refuellable ESS 204 includes a plurality of replaceable fuel elements 216 to increase the electrical power capacity of the discretely refuellable ESS 204, increase the electrical energy capacity of the discretely refuellable ESS 204, and allow for staggered or overlapping discharge of the replaceable fuel elements 216 to provide a continuous production of electricity.

Figure 3:
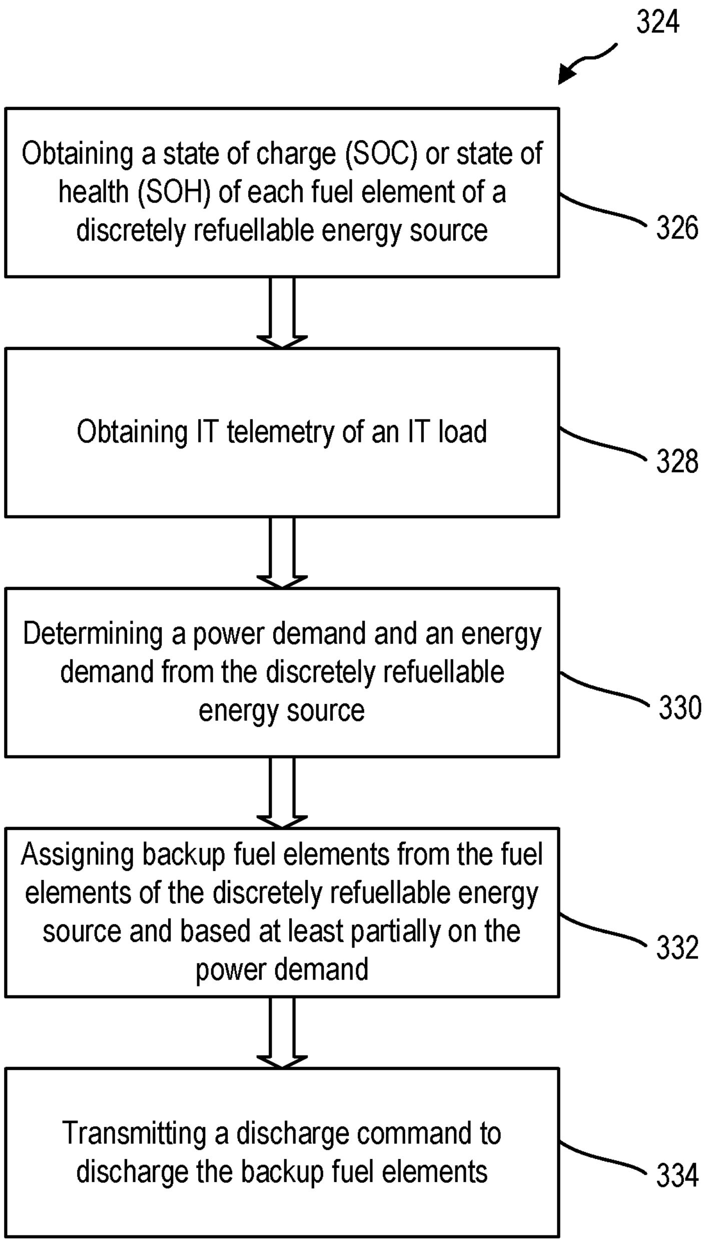
FIG. 3 is a flowchart illustrating a method of providing power in a datacenter, according to at least some embodiments of the present disclosure.

FIG. 3 is a flowchart illustrating a method 324 of providing electrical power in a datacenter. In some embodiments, the method 324 includes the energy controller obtaining a state of charge (SOC) or state of health (SOH) of each fuel element of a discretely refuellable energy source at 326 and obtaining IT telemetry of an IT load at 328. The energy controller may obtain the SOC or the SOH of each fuel element of the discretely refuellable ESS from the discretely refuellable ESS or by measuring or requesting the SOC or SOH of the replaceable fuel elements, directly. The IT telemetry may be obtained by the energy controller from a rack manager, a row manager, the allocator, or from the server computers or other equipment of the IT load.

The method 324, in some embodiments further includes determining a power demand and an energy demand of the IT load from the discretely refuellable energy source at least partially on the IT telemetry at 330. For example, the method 324 may include obtaining a current electrical power draw of the IT load to determine the power demand that allows the IT load to continue operating at the current level. In another example, the method 324 may include measuring a trend of IT telemetry to predict a future power demand or energy demand to continue or complete the current workload.

In some embodiments, the energy controller, according to the method 324, assigns backup fuel elements from the fuel elements of the discretely refuellable ESS and based at least partially on the power demand at 332 and transmits a discharge command to discharge the backup fuel elements at 334. For example, the energy controller, after determining the power demand and energy demand of the IT load, may compare the SOC and/or SOH of the fuel elements to the demand(s) to assign at least one of the fuel elements as a backup fuel element. In one example, the power demand of the IT load is 300 kW, and the energy controller determines that a set of three fuel elements of the discretely refuellable ESS is capable of providing 300 kW of electrical power. In addition, the energy demand of the IT load is determined to be 100 kWh, and the energy controller assigns three fuel elements as backup fuel elements that have a total of at least 100 kWh and at least 33 kWh of available energy (based on the obtained SOC or SOH) such that all three have sufficient available energy to discharge concurrently at 100 KW to meet the power demand.

In at least one example, a fuel element may have insufficient SOC or SOH to discharge continuously through the predicted power demand and/or energy demand, and additional fuel elements are assigned as backup fuel elements. For example, a first fuel element may be partially discharged (e.g., a SOC of 50% indicating an estimated 50 kWh) and a second fuel element may be partially discharged (e.g., a SOC of 60% indicating an estimated 60 kWh). The first fuel element and second fuel element may be assigned as backup fuel elements to provide a total of 110 kWh.

In some embodiments, the energy controller transmits a discharge command to discharge the backup fuel elements in sequence, concurrently, or both depending on the power demand. For example, the first fuel element and second fuel element of the above example may be discharged sequentially when a single fuel element is able to meet the power demand, and the first fuel element and second fuel element may be discharged when a greater power output is needed to meet the power demand. In some examples, the first fuel element and the second fuel element are discharged at the same discharge rate (e.g., 50 KW). In some examples, the first fuel element is discharged at a first discharge rate and the second fuel element is discharged at a second discharge rate where the first discharge rate and second discharge rate are different.

Referring again to the above example, it may be desired to deplete the first fuel element and the second fuel element at the same time, and the first fuel element may be discharged at a first discharge rate of 25 KW and the second fuel element may be discharged at a second discharge rate of 30 kW, substantially depleting both elements in 2 hours at a total power output of 55 kW. In yet another example, it may be desired to deplete the first fuel element and the second fuel element at different times, allowing one to continue producing electrical power while the other is replaced. In such an example, the first fuel element may be discharged at a first discharge rate of 50 kW and the second fuel element may be discharged at a second discharge rate of 5 KW, substantially depleting the first fuel element in one hour with a total power output of 55 kW, at which point the second discharge rate may be increased to 55 KW, providing a second hour of 55 KW of electrical power and substantially depleting the second fuel element over the course of a second hour.

In some embodiments, the energy demand is based at least partially on an outage duration timer. For example, the energy controller records the duration of a power outage of the regional power grid. The energy controller can store a record of power outages of the regional power grid to predict an energy demand of a current outage. For example, a majority of power outages are brief (e.g., under 1 minute) and a power outage that extends beyond 1 minute is most likely to have a duration of less than 5 minutes, while any power outage that extends beyond 5 minutes may be likely to extend for over 1 hour. In other examples, the grid information source may provide an outage duration estimate provided by the grid operator. The outage duration estimate may provide the energy controller with the duration prediction to determine the energy demand.

Figure 4:
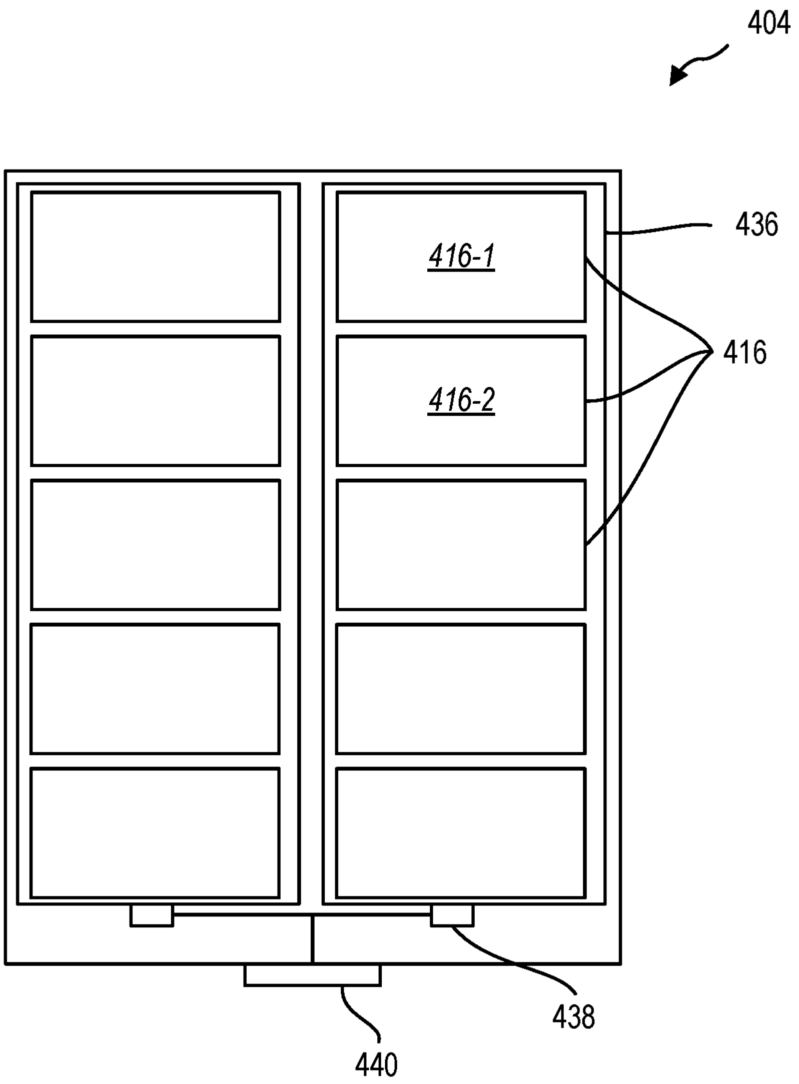
FIG. 4 is a diagram of a discretely refuellable energy storage system (ESS) for providing electrical power in a datacenter, according to at least some embodiments of the present disclosure.

FIG. 4 is a schematic representation of a discretely refuellable ESS 404 with a plurality of modules 436 that each include one or more replaceable fuel elements 416. The modules 436, in some embodiments, include electrical contacts 438 that provide electrical communication between the replaceable fuel element(s) 416 therein and an electrical terminal 440 of the discretely refuellable ESS 404. The energy controller 408 is in data communication and/or electrical communication with the plurality of modules 436 to obtain SOC and/or SOH information for each of the replaceable fuel elements 416 and other information, such as discharge rates, of each module 436. The energy controller 408 is also in data communication and/or electrical communication with the plurality of modules 436 to communicate commands or instructions to the modules 436 to selectively discharge the replaceable fuel element(s) 416 therein.

Figure 5:
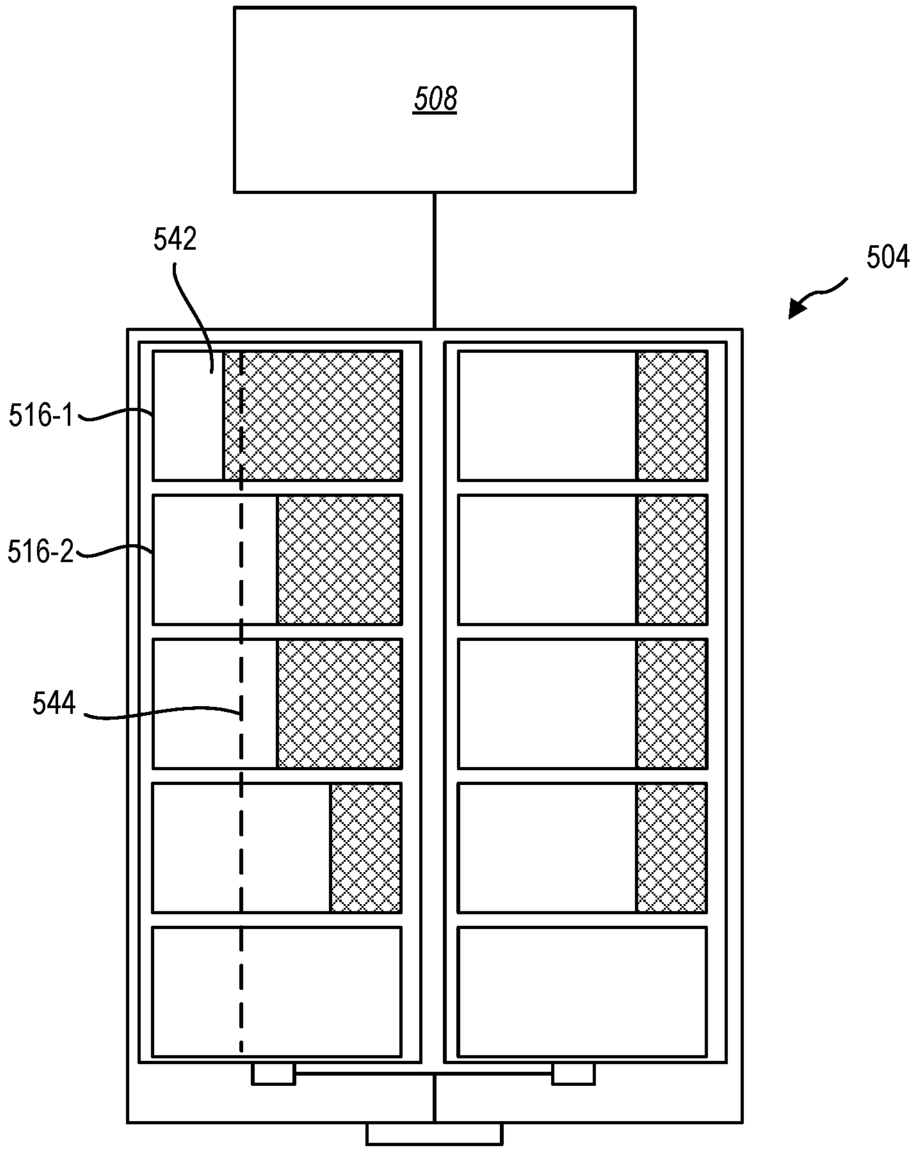
FIG. 5 is a schematic illustration of a discretely refuellable ESS with fuel elements with different states of charge, according to at least some embodiments of the present disclosure.

For example, FIG. 5 schematically illustrates a SOC 542 or SOH of each of a replaceable fuel element 516 in a discretely refuellable ESS 504. For example, the different replaceable fuel elements 516 may have different SOCs 542 or SOHs based on an age or prior discharge of the replaceable fuel element 516. For example, FIG. 5 illustrates an embodiment of a discretely refuellable ESS 504 after a regional grid power outage during which the energy controller 508 transmitted a discharge command to discharge a portion of at least some of the replaceable fuel elements 516. For example, six of the ten replaceable fuel elements 516 were discharged at least partially, with a first replaceable fuel element 516-1 discharged to a lower SOC 542 than a second replaceable fuel element 516-2. In some embodiments, the first replaceable fuel element 516-1 now has less available energy than the second replaceable fuel element 516-2. The energy controller 508 in data communication with the discretely refuellable ESS 504 obtains the relative SOCs 542 and can coordinate the discharge duration and/or discharge timing/sequencing for the replaceable fuel elements.

In some embodiments, the energy controller assigns a replaceable fuel element 516 as a low-state fuel element when an SOC 542 or SOH of a replaceable fuel element 516 is determined to be below a threshold value 544. In some embodiments, the energy controller assigns a replaceable fuel element 516 as a low-state fuel element when an SOC 542 or SOH of a replaceable fuel element 516 will be below the threshold value 544 after providing energy based on the energy demand. For example, a low-state fuel element with an SOC 542 or SOH below the threshold value 544 may be considered to have insufficient available energy remaining in the replaceable fuel element 516 to rely upon that replaceable fuel element 516 in the event of an outage of the regional power grid.

In some embodiments, the energy controller 508 transmits a discharge command to the discretely refuellable ESS 504 to discharge the remaining energy in the low-state fuel element in preparation for replacement of the low-state fuel element. For example, a non-rechargeable fuel element, such as an aluminum anode described herein, cannot be partially recharged, so any remaining energy left in the non-rechargeable fuel element will be lost upon recycling of the non-rechargeable fuel element into a new fuel element. Therefore, it may be desirable to discharge the low-state fuel element(s) substantially completely before replacement.

In some embodiments, the energy discharged from the low-state fuel element is provided to the IT load to supplement electrical power from the power grid. In some embodiments, the energy discharged from the low-state fuel element is provided to the IT load during an outage of the power grid (e.g., the energy controller prioritizes discharging the low-state fuel element(s) during an outage). In some embodiments, the energy discharged from the low-state fuel element is provided to the regional power grid. For example, the discretely refuellable ESS 504 may participate in grid services by selling electrical power to the regional power grid.

Figure 6:
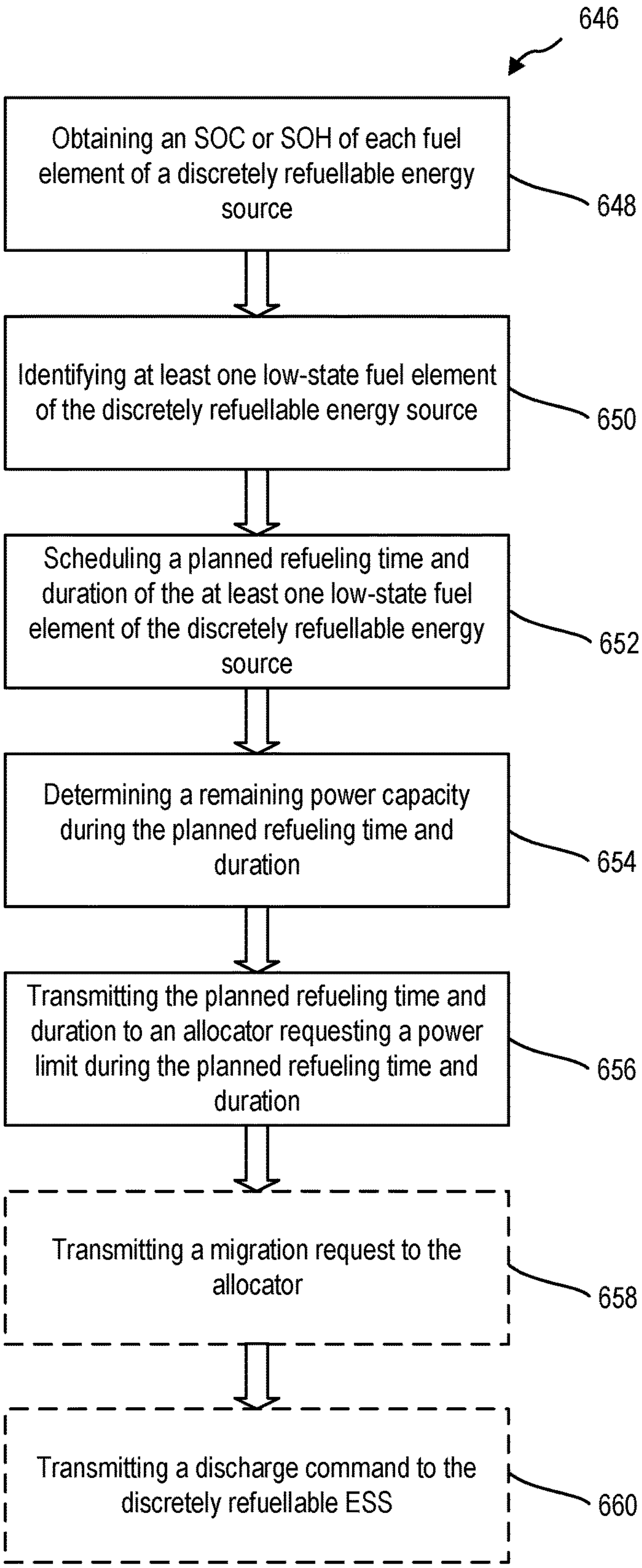
FIG. 6 is a flowchart illustrating another method of providing power in a datacenter, according to at least some embodiments of the present disclosure.

FIG. 6 illustrates an embodiment of a method of discharging a low-state fuel element based at least partially on a SOC or SOH of the fuel element(s) in a discretely refuellable ESS. The method 646 includes obtaining an SOC or SOH of each fuel element of a discretely refuellable energy source at 648. Based on comparing the SOC or SOH to a threshold value, such as that described in relation to FIG. 5, the method 646 includes identifying at least one low-state fuel element of the discretely refuellable energy source at 650 and scheduling a planned refueling time and duration of the at least one low-state fuel element of the discretely refuellable energy source at 652.

In some embodiments, the energy controller schedules a planned refueling time and duration of the at least one low-state fuel element based at least partially on grid information. For example, the planned refueling time and duration may be scheduled based on grid pricing information. As discharging the low-state fuel element can be scheduled independently of datacenter or IT load power demands, the energy controller may discharge the low-state fuel element when selling the electricity to the power grid is most valuable. In other examples, the low-state fuel element can be scheduled to be discharged based on grid carbon load information. For example, the grid information may inform the energy controller of the carbon intensity of the current source of electricity in the regional power grid. When the regional power grid can leverage renewable energy sources, the carbon load is less than when the regional power grid is sourcing electricity from combustion-based energy sources, such as coal combustion. The energy controller, in some embodiments, schedules the discharge of the low-state fuel element(s) to coincide with periods of high carbon load from the regional power grid to offset the electricity consumption of the IT load from the regional power grid.

In some embodiments, the energy controller schedules a planned refueling time and duration of the at least one low-state fuel element based at least partially on workload information and/or IT telemetry. For example, during the replacement of one or more replaceable fuel elements, the discretely refuellable ESS can less energy production capacity in the event of an outage. In some embodiments, the energy controller schedules a planned refueling time and/or duration based at least partially on recorded or obtained historical data on power demand of the IT load, such as due to workload. In at least one example, power demand is lower during nighttime hours than during daytime hours, and the energy controller may schedule the planned refueling time and duration of the at least one low-state fuel element during nighttime. In at least one other example, power demand is lower on weekend mornings than weekend evenings, and the energy controller may schedule the planned refueling time and duration of the at least one low-state fuel element during morning.

The method 646 further includes, in some embodiments, determining a remaining power capacity during the planned refueling time and duration at 654 and transmitting the planned refueling time and duration to an allocator requesting a power limit during the planned refueling time and duration based at least partially on the remaining power capacity at 656. Based upon the quantity of replaceable fuel elements scheduled to be replaced during the planned refueling, the energy controller determines the remaining power capacity of the discretely refuellable ESS during the planned refueling.

In some embodiments, determining the remaining power capacity includes determining the remaining energy capacity of the discretely refuellable ESS during the planned refueling. In the event the duration of the planned refueling is long enough to deplete the remaining energy, the energy controller may determine that only a portion of the low-state fuel elements should be discharged and replaced such that more of the fuel elements in the discretely refuellable ESS remain available, even in a low-state, in the event of an outage.

Optionally, the method 646 includes, in some embodiments, transmitting a migration request to the allocator at 658. In some examples, limiting the workload by not assigning more processes or VMs to the IT load may be insufficient to satisfy the power limit.

Optionally, the method 646 includes, in some embodiments, transmitting a discharge command to the discretely refuellable ESS at 660. In some embodiments, transmitting the discharge command includes transmitting the discharge command immediately upon transmission of the planned refueling time and duration to the allocator.

In some embodiments, transmitting the discharge command includes transmitting a discharge command that includes instructions to time the discharge of the fuel element to complete the discharge of the fuel element prior to the planned refueling time. For example, the discharge command may instruct or allow the discretely refuellable ESS to maintain the fuel element at the same SOC or SOH in case the energy stored therein is needed prior to the planned refueling time. The discretely refuellable ESS may then begin discharging the remaining energy of the fuel element prior to the planned refueling time such that the fuel element is substantially depleted at the planned refueling time. In at least one example, a low-state fuel element has 20 kWh of remaining energy in the SOC or SOH, and the discretely refuellable ESS (based on the discharge command from the energy controller) begins discharging the low-state fuel element at a discharge rate of 20 kW beginning at least one hour prior to the planned refueling time.

In some embodiments, transmitting the discharge command includes waiting to transmit the discharge command such that the discretely refuellable ESS discharges the remaining energy of the fuel element prior to the planned refueling time such that the fuel element is substantially depleted at the planned refueling time. For example, a low-state fuel element has 20 kWh of remaining energy in the SOC or SOH, and the energy controller waits to instruct the discretely refuellable ESS to discharge the low-state fuel element at a discharge rate that will deplete the low-state fuel element at the time of the planned refueling time. In at least one example, the energy controller waits at least some period of time after scheduling the planned refueling time and duration and then transmits the discharge command to the discretely refuellable ESS with instructions to discharge the low-state fuel element at a discharge rate to substantially deplete the low-state fuel element before the planned refueling time.

Figure 7:
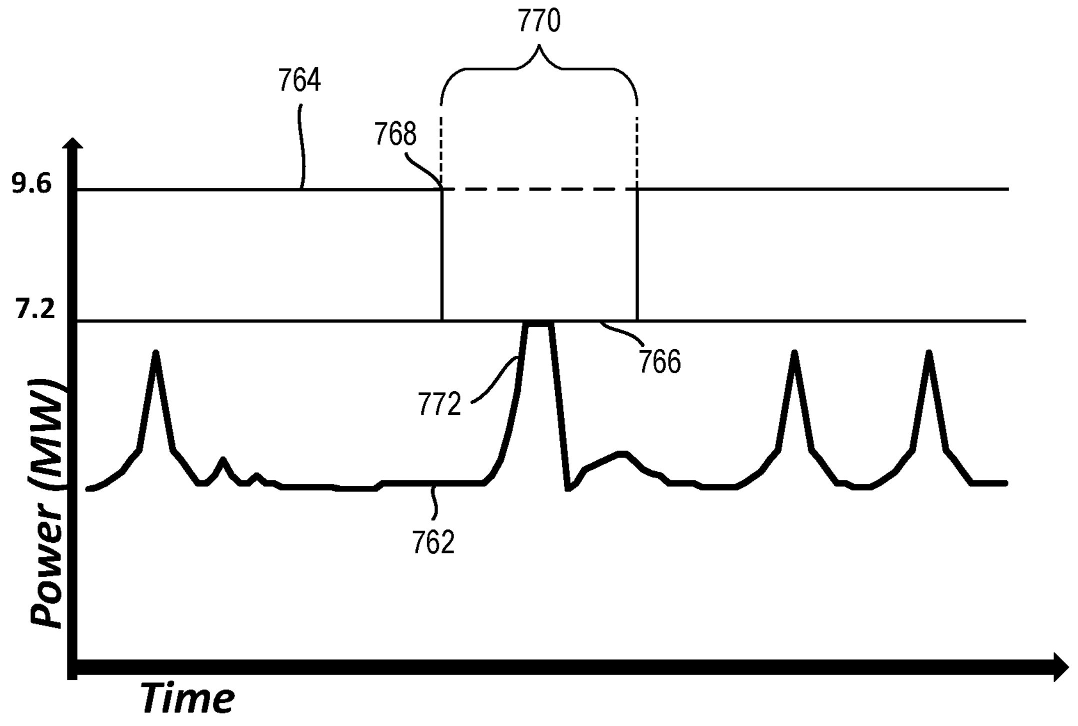
FIG. 7 is a graph illustrating power management in a datacenter with a discretely refuellable ESS, according to at least some embodiments of the present disclosure.

FIG. 7 is a graph illustrating an embodiment of determining a remaining power capacity during the planned refueling time and duration and managing the power demand prior to and during the planned refueling. The graph illustrates the power demand 762 of the IT load relative to time and may include predicted power demand 762, such as based on historical trends and/or predictive models. The graph illustrates a full power capacity 764 able to be provided to the IT load under normal operating conditions and a power limit 766 able to be provided to the IT load that reflects the power output of the discretely refuellable ESS with at least the low-state fuel elements unavailable for power output. For example, the power limit 766 may reflect the low-state fuel elements being fully discharged in preparation for the planned refueling time 768 and/or removed from the discretely refuellable ESS during the planned refueling duration 770.

During the planned refueling duration 770 the allocator, rack manager, row manager, or another control plane may power cap the IT load at or below the power limit 766. In some embodiments, such as when an increased power demand 772 is predicted, the allocator, rack manager, row manager, or another control plane may migrate at least a portion of the workload from the IT load to other IT resources (such as in another portion of the datacenter or in another datacenter) to lessen the power demand 762.

In at least some embodiments according to the present disclosure, systems and methods for providing electrical power to a datacenter can leverage the intermediate- and/or long-duration storage capabilities of discretely refuellable ESSs with limited or no downtime during refueling by coordinating the discharge and refueling of fuel elements and proactively discharging and replacing low-state fuel elements.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system comprising:

an information technology (IT) load;

a grid connection configured to provide electrical communication between the IT load and a power grid;

a grid information source in communication with the grid connection and configured to obtain grid information;

a discretely refuellable energy source in electrical communication with the IT load, wherein the discretely refuellable energy source includes a plurality of replaceable fuel elements; and an energy controller in data communication with the grid information source and configured to discharge the discretely refuellable energy source to the IT load based on the grid information, wherein the energy controller is configured to discharge a first replaceable fuel element of the plurality of replaceable fuel elements at a first discharge rate and a second replaceable fuel element of the plurality of replaceable fuel elements at a second discharge rate wherein the first discharge rate is different from the second discharge rate.

2. The system of claim 1, wherein the discretely refuellable energy source includes a metal-air battery.

3. The system of claim 2, wherein the metal-air battery is an aluminum-air battery.

4. The system of claim 1, wherein at least one replaceable fuel element of the plurality of replaceable fuel elements is an anode.

5. The system of claim 1, wherein at least one of the first discharge rate and the second discharge rate is based on an available energy state of the first replaceable fuel element and the second first replaceable fuel element.

6. The system of claim 1, wherein at least one of the first discharge rate and the second discharge rate is based on the grid information.

7. A method of providing electrical power to a datacenter, the method comprising:

at an energy controller:

obtaining a state of charge (SOC) or state of health (SOH) of each fuel element of a plurality of replaceable fuel elements of a discretely refuellable energy source;

obtaining IT telemetry of an IT load;

determining a power demand and an energy demand from the discretely refuellable energy source;

assigning backup fuel elements from the fuel elements of the discretely refuellable energy source and based on the power demand; and transmitting a discharge command to discharge the backup fuel elements, wherein the discharge command instructs the discretely refuellable energy source to discharge a first replaceable fuel element of the plurality of replaceable fuel elements at a first discharge rate and a second replaceable fuel element of the plurality of replaceable fuel elements at a second discharge rate wherein the first discharge rate is different from the second discharge rate.

8. The method of claim 7, wherein the energy demand is based on an outage duration timer.

9. The method of claim 7, wherein the energy demand is based on an outage duration prediction.

10. The method of claim 7, wherein the power demand is determined based on an IT workload of the IT telemetry.

11. The method of claim 7, further comprising assigning a low-state fuel element with a SOC or SOH below a threshold value.

12. The method of claim 7, wherein assigning backup fuel elements is based on a relative SOC or SOH of the fuel elements of the discretely refuellable energy source.

13. The method of claim 7, wherein the first discharge rate and the second discharge rate are determined based on a relative SOC or SOH of the fuel elements of the discretely refuellable energy source.

14. A method of refueling a discretely refuellable energy source, the method comprising:

at an energy controller:

obtaining a state of charge (SOC) or state of health (SOH) of each fuel element of a discretely refuellable energy source;

identifying at least one low-state fuel element of a plurality of replaceable fuel elements of the discretely refuellable energy source;

scheduling a planned refueling time and duration of the at least one low-state fuel element of the discretely refuellable energy source;

determining a remaining power capacity during the planned refueling time and duration; and transmitting the planned refueling time and duration to an allocator requesting a power limit during the planned refueling time and duration based on the remaining power capacity; and transmitting a discharge command to the discretely refuellable energy source, wherein the discharge command instructs the discretely refuellable energy source to discharge the at least one low-state fuel element of the plurality of replaceable fuel elements at a first discharge rate and a second replaceable fuel element of the plurality of replaceable fuel elements at a second discharge rate wherein the first discharge rate is different from the second discharge rate.

15. The method of claim 14, further comprising transmitting a migration request to the allocator to migrate at least some workload from an IT load powered by the discretely refuellable energy source.

16. The method of claim 14, wherein the discharge command to the discretely refuellable energy source includes instructions to deplete the at least one low-state fuel element before the planned refueling time.

17. The method of claim 16, further comprising obtaining grid information from a regional power grid, and wherein the discharge command includes instructions to discharge the at least one low fuel element based on the grid information.

* * * * *